US010155534B2

(12) United States Patent
Varunjikar et al.

(10) Patent No.: US 10,155,534 B2
(45) Date of Patent: Dec. 18, 2018

(54) DRIVER INTENT ESTIMATION WITHOUT USING TORQUE SENSOR SIGNAL

(71) Applicant: STEERING SOLUTIONS IP HOLDING CORPORATION, Saginaw, MI (US)

(72) Inventors: Tejas M. Varunjikar, Saginaw, MI (US); Anthony J. Champagne, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/181,482

(22) Filed: Jun. 14, 2016

(65) Prior Publication Data

US 2017/0355396 A1  Dec. 14, 2017

(51) Int. Cl.
 *B62D 6/00* (2006.01)
 *B62D 5/04* (2006.01)

(52) U.S. Cl.
 CPC ............. *B62D 6/002* (2013.01); *B62D 5/049* (2013.01); *B62D 5/0481* (2013.01); *B62D 6/006* (2013.01); *B62D 5/0463* (2013.01); *Y02T 10/7258* (2013.01)

(58) Field of Classification Search
 CPC ...... B62D 6/002; B62D 6/006; B62D 5/0463; B62D 5/0481; B62D 6/00; B62D 15/025; B62D 6/10; B62D 6/02; B60Y 2300/0223; B60Y 2300/0227
 USPC .......................................................... 701/41
 See application file for complete search history.

(56) References Cited

U.S. PATENT DOCUMENTS

| 4,660,671 A | 4/1987 | Behr et al. |
| 4,800,974 A | 1/1989 | Wand et al. |
| 4,874,053 A | 10/1989 | Kimura et al. |
| 5,029,466 A | 7/1991 | Nishihara et al. |
| 5,473,539 A | 12/1995 | Shimizu et al. |
| 5,482,129 A | 1/1996 | Shimizu |
| 5,709,281 A | 1/1998 | Sherwin et al. |
| 5,919,241 A | 7/1999 | Bolourchi et al. |
| 5,927,421 A | 7/1999 | Fukada |
| 5,948,030 A | 9/1999 | Miller et al. |

(Continued)

FOREIGN PATENT DOCUMENTS

| CN | 1442336 A | 9/2003 |
| CN | 1651293 A | 8/2005 |

(Continued)

OTHER PUBLICATIONS

AFCP Decision w/Art dated Dec. 29, 2016.

(Continued)

*Primary Examiner* — Jaime Figueroa
(74) *Attorney, Agent, or Firm* — Cantor Colburn LLP (57) ABSTRACT

A system for determining driver torque includes a rack torque estimator module that determines an estimated rack torque value based on a motor angle, and a motor velocity. The system further includes a driver intent detection module that computes a disturbance torque scaling factor based on the estimated rack torque value. The system further includes a blend module that generates a motor torque assist command based on a scaled value of the estimated rack torque value using the disturbance torque scaling factor.

22 Claims, 6 Drawing Sheets

(56) References Cited

U.S. PATENT DOCUMENTS

| | | | |
|---|---|---|---|
| 5,992,557 A | 11/1999 | Nakamura et al. |
| 6,032,091 A | 2/2000 | Noro et al. |
| 6,152,254 A | 11/2000 | Phillips |
| 6,223,852 B1 | 5/2001 | Mukai et al. |
| 6,250,419 B1 | 6/2001 | Chabaan et al. |
| 6,298,941 B1 | 10/2001 | Spadafora |
| 6,370,459 B1 | 4/2002 | Phillips |
| 6,425,454 B1 | 7/2002 | Chabaan et al. |
| 6,588,541 B2 | 7/2003 | Norman et al. |
| 6,687,590 B2 | 2/2004 | Kifuku et al. |
| 6,690,137 B2 | 2/2004 | Iwaji et al. |
| 6,742,620 B2 | 6/2004 | Eidam et al. |
| 6,799,656 B2 | 10/2004 | Kimura et al. |
| 6,959,970 B2 | 11/2005 | Tseng |
| 7,040,450 B2 | 5/2006 | Nagase et al. |
| 7,558,661 B2 | 7/2009 | Sundaram et al. |
| 7,596,441 B2 | 9/2009 | Yokota et al. |
| 7,613,258 B2 | 11/2009 | Yu et al. |
| 7,885,750 B2 | 2/2011 | Lu |
| 7,954,593 B2 | 6/2011 | Dornhege et al. |
| 7,974,754 B2 | 7/2011 | Nakatsu |
| 7,975,801 B2 | 7/2011 | Tashiro |
| 8,010,252 B2 | 8/2011 | Getman et al. |
| 8,108,105 B2 | 1/2012 | Saruwatari et al. |
| 8,165,770 B2 | 4/2012 | Getman et al. |
| 8,170,751 B2 * | 5/2012 | Lee .................. B62D 15/025 |
| | | | 180/204 |
| 8,175,771 B2 | 5/2012 | Ukai et al. |
| 8,219,283 B2 | 7/2012 | Recker et al. |
| 8,548,667 B2 | 10/2013 | Kaufmann et al. |
| 8,571,759 B2 | 10/2013 | Oblizajek et al. |
| 8,666,605 B2 | 3/2014 | DeLarche et al. |
| 8,666,607 B2 | 3/2014 | Kojo |
| 8,798,864 B2 | 8/2014 | Champagne et al. |
| 8,825,301 B2 | 9/2014 | Sugawara et al. |
| 8,843,276 B2 | 9/2014 | Kojo et al. |
| 8,903,606 B2 | 12/2014 | Kleinau et al. |
| 8,977,433 B2 | 3/2015 | Kojima |
| 8,977,436 B2 | 3/2015 | Endo et al. |
| 8,977,437 B2 | 3/2015 | Tamaizumi et al. |
| 9,067,601 B2 | 6/2015 | Itabashi et al. |
| 9,327,761 B2 | 5/2016 | Tsubaki |
| 9,387,875 B2 | 7/2016 | Shimizu et al. |
| 9,409,595 B2 | 8/2016 | Varunjikar et al. |
| 9,452,775 B2 | 9/2016 | Tamura et al. |
| 9,540,040 B2 | 1/2017 | Varunjikar et al. |
| 9,540,044 B2 | 1/2017 | Kaufmann et al. |
| 9,545,945 B2 | 1/2017 | Akatsuka et al. |
| 9,676,409 B2 | 6/2017 | Champagne et al. |
| 2002/0005316 A1 | 1/2002 | Tokumoto |
| 2002/0026267 A1 | 2/2002 | Kifuku |
| 2002/0092696 A1 | 7/2002 | Bohner et al. |
| 2002/0177932 A1 | 11/2002 | Kifuku et al. |
| 2002/0179362 A1 | 12/2002 | Norman et al. |
| 2003/0030404 A1 | 2/2003 | Iwaji et al. |
| 2003/0074120 A1 * | 4/2003 | Kleinau .................. B62D 5/0463 |
| | | | 701/41 |
| 2003/0150366 A1 | 8/2003 | Kaufmann et al. |
| 2004/0024505 A1 | 2/2004 | Salib et al. |
| 2004/0055810 A1 | 3/2004 | Chabaan |
| 2004/0099469 A1 | 5/2004 | Koibuchi et al. |
| 2004/0117088 A1 | 6/2004 | Dilger |
| 2004/0262063 A1 * | 12/2004 | Kaufmann ............. B62D 1/286 |
| | | | 180/169 |
| 2005/0189163 A1 | 9/2005 | Barton et al. |
| 2005/0206224 A1 | 9/2005 | Lu |
| 2005/0206229 A1 | 9/2005 | Lu et al. |
| 2005/0246085 A1 | 11/2005 | Salib et al. |
| 2005/0256620 A1 | 11/2005 | Kato |
| 2006/0060412 A1 * | 3/2006 | Bolourchi ............... B62D 5/008 |
| | | | 180/443 |
| 2006/0069481 A1 | 3/2006 | Kubota et al. |
| 2007/0299580 A1 | 12/2007 | Lin |
| 2008/0147276 A1 | 6/2008 | Pattok et al. |
| 2009/0024281 A1 | 1/2009 | Hwang |
| 2009/0105907 A1 | 4/2009 | Yamaguchi et al. |
| 2009/0125186 A1 | 5/2009 | Recker et al. |
| 2009/0143938 A1 | 6/2009 | Nishimura |
| 2009/0216407 A1 | 8/2009 | Cottard et al. |
| 2009/0240389 A1 | 9/2009 | Nomura et al. |
| 2009/0271075 A1 * | 10/2009 | Hales .................. B62D 5/0472 |
| | | | 701/43 |
| 2009/0292421 A1 | 11/2009 | Williams et al. |
| 2009/0294206 A1 | 12/2009 | Oblizajek et al. |
| 2010/0100283 A1 | 4/2010 | Hales et al. |
| 2010/0286869 A1 | 11/2010 | Katch et al. |
| 2011/0010054 A1 * | 1/2011 | Wilson-Jones ...... B62D 5/0463 |
| | | | 701/42 |
| 2011/0022272 A1 | 1/2011 | Hung et al. |
| 2011/0213527 A1 * | 9/2011 | Itabashi ................ B60W 10/06 |
| | | | 701/37 |
| 2011/0218706 A1 | 9/2011 | Mori et al. |
| 2011/0282552 A1 | 11/2011 | Gebregergis et al. |
| 2012/0041644 A1 | 2/2012 | Turner |
| 2012/0199414 A1 | 8/2012 | Shimizu et al. |
| 2012/0232754 A1 | 9/2012 | Champagne et al. |
| 2012/0261209 A1 | 10/2012 | Shiino |
| 2012/0312627 A1 | 12/2012 | Morishita et al. |
| 2013/0024072 A1 | 1/2013 | Michelis et al. |
| 2013/0030654 A1 | 1/2013 | Oblizajek et al. |
| 2013/0073146 A1 | 3/2013 | Konomi et al. |
| 2013/0124048 A1 * | 5/2013 | Gruener ............... B62D 5/0472 |
| | | | 701/42 |
| 2013/0131926 A1 | 5/2013 | Champagne et al. |
| 2013/0151066 A1 | 6/2013 | Koukes et al. |
| 2013/0201047 A1 | 8/2013 | Tsai et al. |
| 2013/0261894 A1 | 10/2013 | Kojima |
| 2014/0005894 A1 | 1/2014 | Aoki |
| 2014/0149000 A1 | 5/2014 | Tamura et al. |
| 2014/0257641 A1 | 9/2014 | Champagne et al. |
| 2014/0303848 A1 * | 10/2014 | Bean .................. B62D 5/0472 |
| | | | 701/41 |
| 2014/0324294 A1 | 10/2014 | Champagne |
| 2015/0012182 A1 | 1/2015 | Flehmig et al. |
| 2015/0151783 A1 | 6/2015 | Kitazume |
| 2015/0171667 A1 | 6/2015 | Kai et al. |
| 2015/0191200 A1 | 7/2015 | Tsubaki et al. |
| 2016/0001810 A1 | 1/2016 | Tsubaki |
| 2016/0031481 A1 * | 2/2016 | Birsching ............ B62D 5/0835 |
| | | | 701/36 |
| 2016/0075371 A1 | 3/2016 | Varunjikar et al. |
| 2016/0107679 A1 | 4/2016 | Kimura et al. |
| 2016/0229446 A1 * | 8/2016 | Tamaizumi .......... B62D 5/0463 |
| 2016/0288825 A1 | 10/2016 | Varunjikat et al. |
| 2017/0066472 A1 | 3/2017 | Wang et al. |
| 2017/0066473 A1 | 3/2017 | Yu et al. |
| 2017/0158228 A1 | 6/2017 | She |
| 2017/0232998 A1 | 8/2017 | Ramanujam et al. |
| 2017/0355396 A1 | 12/2017 | Varunjikar et al. |

FOREIGN PATENT DOCUMENTS

| | | |
|---|---|---|
| CN | 1935576 A | 3/2007 |
| CN | 100999223 B | 7/2007 |
| CN | 101142548 A | 3/2008 |
| CN | 101218146 A | 7/2008 |
| CN | 101434258 A | 5/2009 |
| CN | 101522504 A | 9/2009 |
| CN | 101683867 A | 3/2010 |
| CN | 101734277 A | 6/2010 |
| CN | 102019957 A | 4/2011 |
| CN | 102556065 A | 7/2012 |
| CN | 102806942 A | 12/2012 |
| CN | 102917939 A | 2/2013 |
| CN | 103079934 A | 5/2013 |
| CN | 102556152 B | 7/2013 |
| CN | 104044586 A | 9/2014 |
| CN | 104334439 A | 2/2015 |
| CN | 104755358 A | 7/2015 |
| DE | 19634728 C1 | 4/1998 |
| DE | 19824914 A1 | 12/1999 |
| DE | 19912169 A1 | 7/2000 |
| DE | 10344279 A1 | 4/2004 |

(56) References Cited

FOREIGN PATENT DOCUMENTS

| | | |
|---|---|---|
| DE | 102005004726 A1 | 8/2006 |
| DE | 102008051552 A1 | 4/2009 |
| DE | 102008036001 A1 | 2/2010 |
| DE | 102013112901 A1 | 5/2015 |
| EP | 0353995 A2 | 2/1990 |
| EP | 1127775 A1 | 8/2001 |
| EP | 1508495 A2 | 2/2005 |
| EP | 1623907 A1 | 2/2006 |
| EP | 1995150 A2 | 11/2008 |
| EP | 2028080 A1 | 2/2009 |
| EP | 1808359 B1 | 4/2009 |
| EP | 2184218 A2 | 5/2010 |
| EP | 2275323 A1 | 1/2011 |
| EP | 2223838 B1 | 11/2011 |
| EP | 2492168 A1 | 8/2012 |
| EP | 2497698 A1 | 9/2012 |
| GB | 2454788 A | 5/2009 |
| JP | 2001106099 A | 4/2001 |
| JP | 2003002222 A | 1/2003 |
| JP | 3712876 B2 | 11/2005 |
| JP | 2006143151 A | 6/2006 |
| JP | 3819261 B2 | 9/2006 |
| JP | 2006248250 A | 9/2006 |
| JP | 2007514602 A | 6/2007 |
| JP | 2009006985 A | 1/2009 |
| JP | 2009051292 A | 3/2009 |
| JP | 2011051409 A | 3/2011 |
| KR | 2006083578 A | 7/2006 |
| WO | 2005097577 A1 | 10/2005 |
| WO | 2011148240 A1 | 12/2011 |
| WO | 2012014399 A1 | 2/2012 |
| WO | 2012066704 A1 | 5/2012 |
| WO | 2012176553 A1 | 12/2012 |

OTHER PUBLICATIONS

CN Application No. 2014106438448 Second Office Action, dated Apr. 24, 2017, 9 pages.
CN Application No. 201510617600 Office Action dated Apr. 12, 2017, 8 pages.
CN Application No. 201510742251 First Office Action dated Apr. 26, 2017, 8 pages.
CN Patent Application No. 201210586416.7 4th Office Action dated Sep. 21, 2016, 8 pages.
English Translation of Chinese Office Action for related CN Application No. 201410643844.8; dated Aug. 22, 2016; 26 pages.
EP Search Report dated Apr. 14, 2016 in related EP Application No. 15184544.3-1755 dated Mar. 14, 2016, 7 pages.
European Office Action for Application No. 15173865.5-1755, dated Sep. 28, 2017 (8 pp.).
Final Office Action dated Mar. 18, 2016.
Final Office Action dated May 29, 2015.
Final Office Action dated Jul. 27, 2017.
Final Office Action, dated Aug. 25, 2016.
Final Rejection dated Mar. 3, 2016.
Gillespie, T.D.; "Fundamentals of Vehicle Dynamics"; Warrendale, PA; Society of Automotive Engineers; 1992; ISBN 1560911999, 9781560911999; pp. 205-206.
Hsu, Yung-Hsiang Judy, "Estimation and Control of Lateral Tire Forces using Steering Torque"; Dissertaion of Stanford University, Mar. 2009; 191 pages.
NFOA, dated Feb. 11, 2016.
Non Final OA dated Mar. 17, 2017.
Non-Final Office Action dated Jan. 5, 2017.
Non-Final Office Action dated Oct. 21, 2015.
Non-Final Office Action dated Aug. 26, 2016.
Non-Final Office Action for U.S. Appl. No. 14/933,461, dated Oct. 3, 2017 (33 pp).
Non-Final Office Action, dated Oct. 3, 2017.
OA dated Sep. 28, 2017.
Office Action dated Aug. 22, 2016.
U.S. Appl. No. 13/299,407, filed Nov. 18, 2011, titled Road Wheel Disturbance Rejection.
U.S. Appl. No. 13/792,897, filed Mar. 11, 2013, titled "Road Wheel Disturbance Rejection Based on Hand Wheel Acceleration".
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Ansgar Rehm, Vehicle Velocity Estimation by Dynamic Inversion of Wheel Force Generation; Control Conference (ECC), 2009 European Year: 2009; pp. 4798-4803.
China Patent Application No. 201210586416.7 3rd Office Action dated Feb. 15, 2016, 14 pages.
D.I. Katzourakis, et al.; "Steering Force Feedback for Human-Machine-Interface Automotive Experiments"; IEEE Transactions on Instrumentation and Measurement, vol. 60, No. 1, pp. 32-43, Jan. 2011.
English Translation of Chinese Office Action for related CN Application No. 20121058416.7; dated Dec. 3, 2014; 15 pages.
English Translation of Chinese Office Action for related CN Application No. 201210586416.7; dated Aug. 12, 2015; 14 pages.
English Translation of CN Office Action & Search Report for related CN Application No. 201410086920.X; dated Nov. 5, 2015; 10 pages.
English Translation of CN Office Action & Search Report for related CN Application No. 2014110331120.X; dated Nov. 30, 2015; 9 pages.
EP Search Report for related EP Application No. 14166178.5; dated Aug. 22, 2014; 7 pages.
European Patent Application No. 14192466.2; office action dated Feb. 5, 2016; 7 pages.
Extended EP Search Report for related EP Application No. 12192967.3, dated Apr. 2, 2013; 8 pages.
Extended EP Search Report for related EP Application No. EP14192466.2; dated Apr. 9, 2015; 8 pages.
Extended EP Search report from related Application No. 151845443-1755: dated Mar. 14, 2016; 7 pages.
Extended European Search Report for related EP Application No. 14156987.1; dated Jan. 21, 2015; 8 pages.
Extended European Search Report for related EP Application No. 15173865.5; dated Nov. 23, 2015; 10 pages.
J.C.F. de Winter, et al.; "A Two-Dimensional Weighting Function for a Driver Assistance System"; IEEE Transactions on Systems, Man and Cybernetics B, Cybern., vol. 38, No. 1, pp. 189-198, Feb. 2008.
Katzourakis, D.I., et al.; "Road-Departure Prevention in an Emergency Obstacle Avoidance Situation"; IEEE Transactions on Systems, Man, and Cybernetics: Systems; vol. 44, Issue 5; vol. 44, No. 5, pp. 621-629.
Peroutka, et al., Design Considerations for Control of Traction Drive with Permanent Magnet Synchronous Machine; Power Electronics and MOtion Control Conference, 2008, EPE-PEMC 2008, 13th Year: 2008; pp. 1529-1534, DOI: 10.1109/EPEPEMC.2008.4635484.
Pornsarayouth, S., et al., Sensor Fusion of Delay and Non-delay Signal using Kalman Filter with Moving Covariance, Robotics and Biomimetics, 2008, ROBIO 2008, IEEE International Conference on: Year 2009; pp. 2045-2049, DOI: 10.1109/ROBIO.2009.4913316.
Wilhelm, et al., Friction Compensation Control for Power Steering, Control Systems Technology, IEEE Transactions on; Year: 2015, vol. PP, Issue: 99; pp. 1-14, DOI:10.1109/TCST.2015.2483561.
English Abstract of Li Yong et al., Control Technique of Vehicle Stability, Jan. 31, 2013, Mechanical Industry Press, 1 page.
Gillespie, Thomas D., Fundamentals of Vehicle Dynamics, 2000, pp. 201-208, Society of Automotive Engineers—Authorized Simplified Chinese translation edition by Scientific & Technical Publishing Co., 2006, pp. 138-142 (correspond to original pp. 201-208).
Gillespie, Thomas D., Fundamentals of Vehicle Dynamics, 2000, pp. 201-208, Society of Automotive Engineers.
Li Yong et al., Control Technique of Vehicle Stability, Jan. 31, 2013, pp. 137-138, Mechanical Industry Press.

(56) References Cited

OTHER PUBLICATIONS

English Translation of Chinese Office Action & Search Report for Chinese Application No. 201611113750.5 dated Apr. 25, 2018, 10 pages.
English Translation of Chinese Office Action & Search Report for Chinese Application No. 201611113886.6 dated Apr. 27, 2018, 7 pages.
DE Application No. 102016116291.4 Translation of Office Action dated Mar. 5, 2018, 5 pages.
DE Application No. 102016116292.2 Translation of Office Action dated Mar. 5, 2018, 5 pages.
Athira Vijayan et al., Precise Tuning for Power Steering, International Conference on Wireless Communications, Signal Processing and Networking (IEEE WiSPNET), 2017, pp. 2309-2313.
Dongpil Lee et al., Disturbance Adaptive Steering Wheel Torque Control for Enhanced Path Tracking of Autonomous Vehicles, American Control Conference (ACC), May 24-26, 2017, pp. 2321-2326, Seattle, WA USA.
Frederic Wilhelm et al., Friction Compensation Control for Power Steering, IEEE Transactions on Control Systems Technology, Jul. 2016, pp. 1354-1367, vol. 24, No. 4, IEEE Journals & Magazines.
Luis Daniel Sosa Ruiz et al., Design and Construction of a Passive Mechanism for Emulation of Load Forces in an Electric Power Steering System, Sep. 20-22, 2017, pp. 1-6, 2017 14th IEEE International Conference on Electrical Engineering, Computing Science and Automatic Control (CCE), Mexico City, Mexico.

\* cited by examiner

DRIVER INTENT ESTIMATION WITHOUT USING TORQUE SENSOR SIGNAL

BACKGROUND

Some electric power steering (EPS) systems use a torque sensor to determine driver-requested assist. If an event affects the functionality of the torque sensor, the system may not be able to provide full assist and revert to a reduced assist mode or loss of assist mode. When EPS is in normal operation, a torque sensor usually measures the driver intention. However, during a torque sensor failure, data representative of driver intention is unavailable.

SUMMARY

According to one or more examples, a power steering system for providing motor torque assist command includes a rack torque estimation module that determines an estimated rack torque value based on a motor angle, and a motor velocity; a driver intent detection module that computes a disturbance torque scaling factor based on the estimated rack torque value; and a blend module that generates the motor torque assist command based on a scaled value of the estimated rack torque value using the disturbance torque scaling factor.

According to one or more examples, a method for providing motor torque assist command by a power steering system, includes determining a estimated rack torque value based on a motor angle, and a motor velocity; computing a disturbance torque scaling factor based on the estimated rack torque value; and generating the motor torque assist command based on a scaled value of the estimated rack torque using the disturbance torque scaling factor.

According to one or more examples, a power steering system for providing driver assistance torque includes a torque sensor configured to detect a driver torque signal from a handwheel of the power steering system; and a control module that, in response to the torque sensor operating without a failure, determines a first estimated rack torque value based on a motor angle, a motor velocity, and the driver torque signal; and generates a first motor torque assist command based on the first estimated rack torque value. The control module, in response to detecting a failure of the torque sensor, determines a second estimated rack torque value based on the motor angle, and the motor velocity (without the driver torque signal); computes a disturbance torque scaling factor based on the second estimated rack torque value; and generates a second motor torque assist command based on a scaled value of the second estimated rack torque value using the disturbance torque scaling factor.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The technical solutions described herein facilitate a power steering system in a vehicle, such as an automobile to provide an assisting force or torque so that a driver of the vehicle can provide lesser effort when turning a steering wheel of the vehicle when driving. Typically, the power steering system provides the assisting force based on a torque sensor that determines the driver requested assist. However, if the torque sensor is absent, disabled, or damaged, or in any other case of failure, the power steering system may not provide the assisting force, which will cause the driver to apply higher than usual torque to the steering. The technical solutions described herein solve such technical problems by computing the assisting force by determining an intention of the driver based on a rack force (kingpin torque) estimator module, without relying on the torque sensor. In one or more examples, the power steering system computes the assisting force as described herein in the background, and in response to detecting a failure of the torque sensor, the power steering system switches to using the assisting force as described herein.

Figure 1:
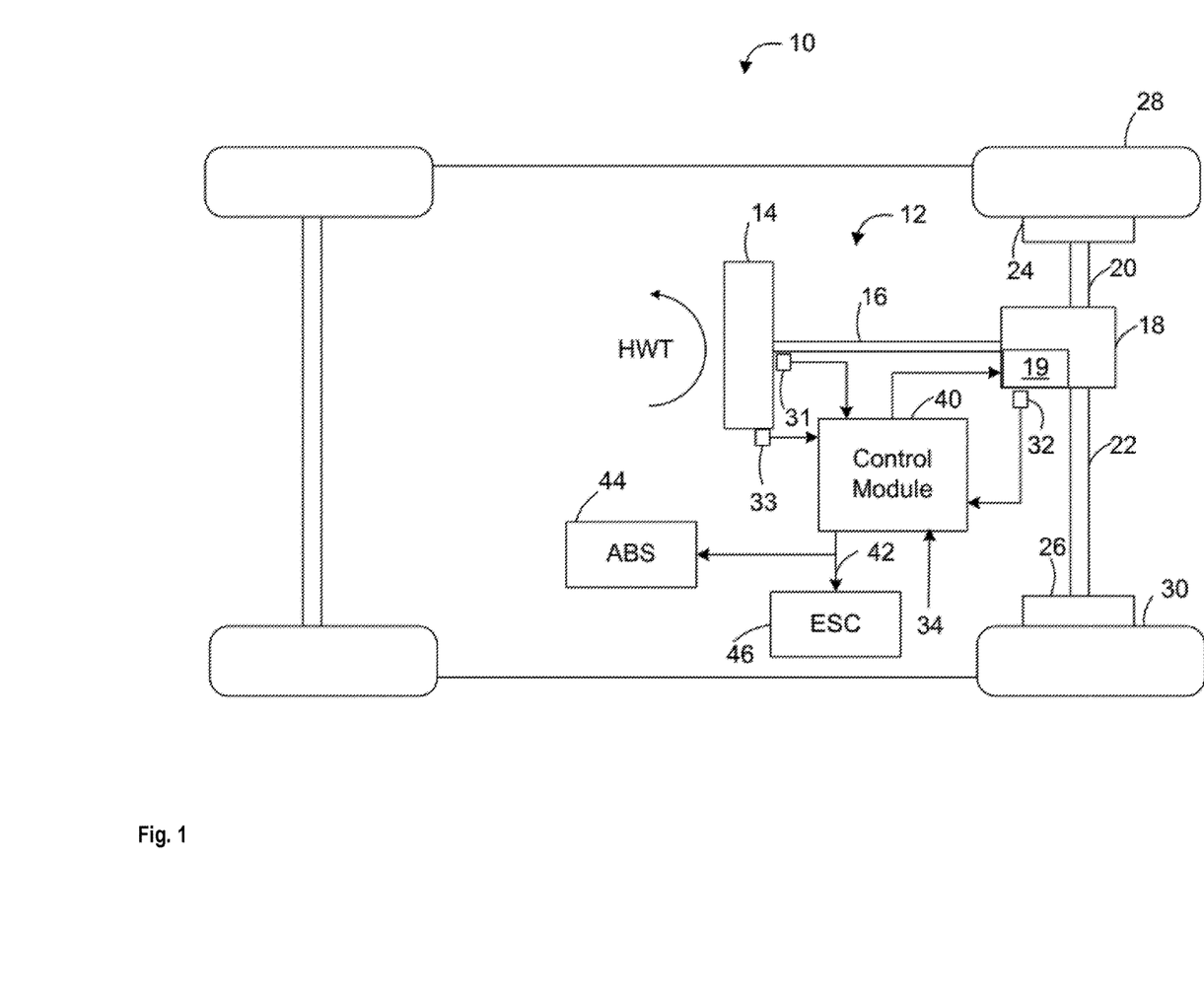
FIG. 1 depicts a schematic diagram of a motor control system in accordance with exemplary embodiments.

Referring now to the Figures, where the invention will be described with reference to specific embodiments, without limiting same, FIG. 1 is an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints. In one exemplary embodiment, the steering system 12 is an electric power steering (EPS) system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein. Communication with the ABS 44, ESC system 46, and other systems (not depicted), can be performed using, for example, a controller area network (CAN) bus or other vehicle network known in the art to exchange signals such as the vehicle speed signal 34.

Figure 2:
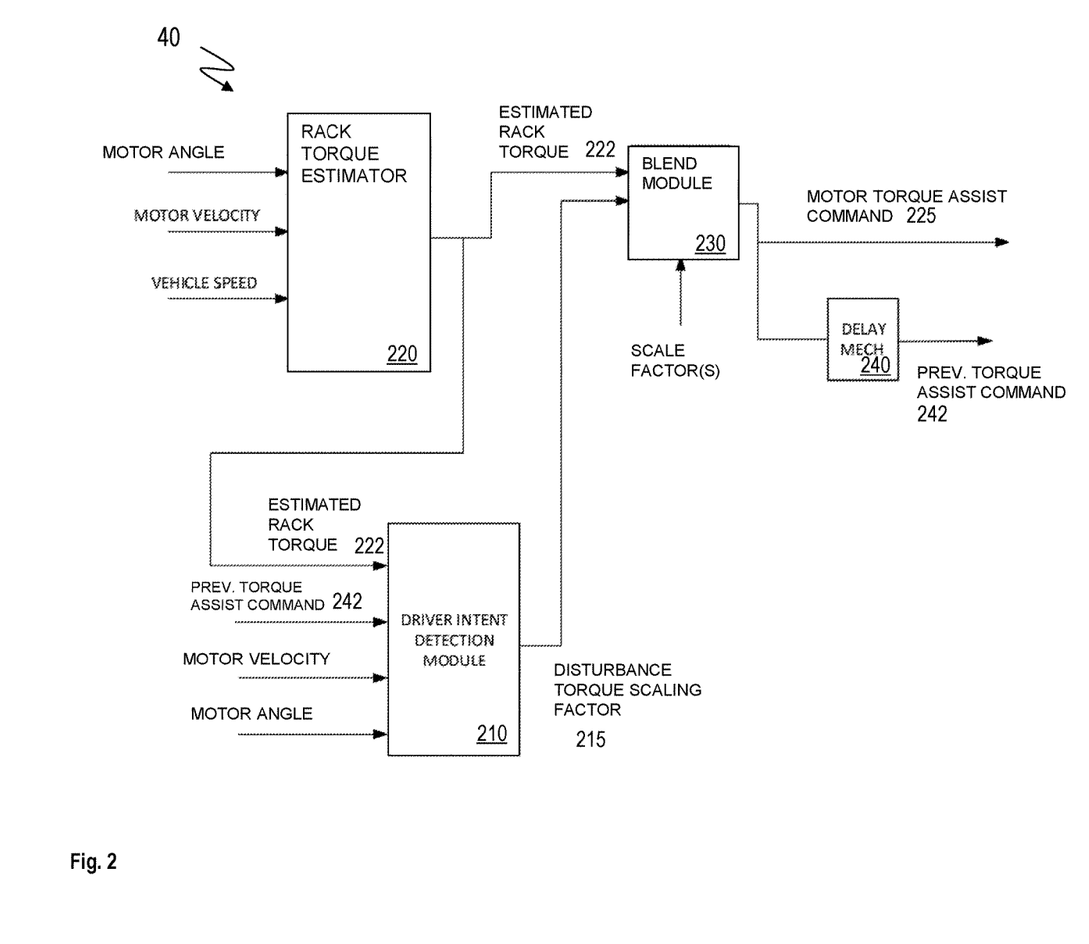
FIG. 2 illustrates a dataflow diagram of a control module in accordance with some embodiments.

FIG. 2 illustrates a dataflow diagram of a control module 40 to compute a driver assist force for the handwheel 14 in case of a failure or absence of the torque sensor 31. In one or more examples, the control module 40 may include a driver intent detection module 210 and a rack torque estimation module 220, among other components. The rack torque estimation module 220 determines an estimated rack torque 222 (also referred to as a motor torque) used to calculate a command to be supplied to the motor of the EPS to assist the driver of the vehicle to control the vehicle via the EPS. In one or more examples, the torque estimation module 220 estimates the rack torque 222 based on measurements from the one or more sensors 31-33 of the EPS. For example, the torque estimation module 220 receives the motor angle, the motor velocity, and the vehicle speed as inputs to compute the rack torque 222.

The torque estimation module 220 may be a static tire torque estimator or a rolling tire torque estimator. Other examples may use any other technique to predict the rack torque, such as in an empirical manner, by using a lookup table, or by using a model based approach, and so on. The static tire motor torque estimator computes the rack torque 222 when the vehicle speed is below a predetermined level, such as less than or equal to 10 KPH, 15 KPH, 20 KPH, or any other such predetermined speed. The rolling tire motor torque estimator computes the rack torque 222 when the vehicle speed is above the predetermined level. In one or more examples, the control module 40 includes two separate rack torque estimator modules, a first static tire rack torque estimator and a second rolling tire rack torque estimator, which operate independently depending on the vehicle speed. Alternatively, the single rack torque estimation module 220 computes the rack torque 222 using a different algorithm depending on the vehicle speed. In one or more examples, the rack torque 222 may be estimated using more than two separate algorithms depending on the vehicle speed being in different ranges, such as 0-20 KPH, 20-40 KPH, 40-60 KPH, or the like. Additionally, or alternatively a measured rack torque (using strain gauge or other sensors) is used as an input for estimating the rack torque 222.

The control module 40 generates a motor torque assist command 225 based on the estimated rack torque 222. For example, the control module 40 may include a blend module 230 that uses one or more scaling factors to scale the estimated rack torque 222 to generate the motor torque assist command 225. The blend module 230 may be a multiplier in one or more examples. It is understood that a multiplier is just one example of the blend module 230 and that in one or more examples, the control module 40 may include additional, or alternative components to generate the motor torque assist command 225 based on the estimated rack torque 222. The motor torque assist command 225 causes the steering system 12 to apply a force to assist the driver that is driving the vehicle, by facilitating the driver to apply lesser force when turning/moving the handwheel 14.

In addition, the blend module 230 receives a disturbance torque scaling factor ($T_{dis}$-SF) 215 generated by the driver intent detection module 210 according the technical solutions described herein. The blend module 230 uses the disturbance torque scaling factor 215 to scale the assist command 225. In one or more examples, the blend module 230 uses the disturbance torque scaling factor 215 if the vehicle speed is below a predetermined threshold, such as 20 KPH. In one or more examples, the disturbance torque scaling factor 215 may have a value of 0 or 1. Thus, the disturbance torque scaling factor 215 may act as to either cancel the assist command 225 (when 0), or continue to apply the assist command as is (when 1). In one or more examples, the disturbance torque scaling factor 215 may have a value from a predetermined range, such as 0 to 1. The driver intent detection module 210 selects a value from the predetermined range based on a rate of change of a disturbance torque that the driver intent detection module 210 computes, as described herein.

The driver intent detection module 210 computes the $T_{dis}$-SF 215 using the estimated rack torque 222 as input. The driver intent detection module 210 computes a disturbance torque based on the signals from the sensors of the steering system 12, thus incorporating uncertainties $T_{uncertainty}$ in the result. For example, as illustrated in FIG. 2, the driver intent detection module 210 receives the motor velocity and motor angle as inputs. In one or more examples, the driver intent detection module 210 receives a previous motor torque assist command 242 generated by the control module 40. The control module 40 provides the previous motor torque assist command 242 by passing the motor torque assist command 225 through a delay component 240. In one or more examples, the delay component 240 may be a unit delay component that provides the last motor torque assist command 242 at sample value P−1 if the current sample value is P. Alternatively, the delay component 240 may delay the motor torque assist command 225 by other sample values, such as 2, 5, 10, or the like to provide a previous motor torque assist command to the driver intent detection module 210. In other words, the delay component 240 may delay the motor assist command 225 by X sample units, so that the previous motor assist command 242 is the motor assist command generated at (T-X)th sample where T indicated current sample.

Figure 3:
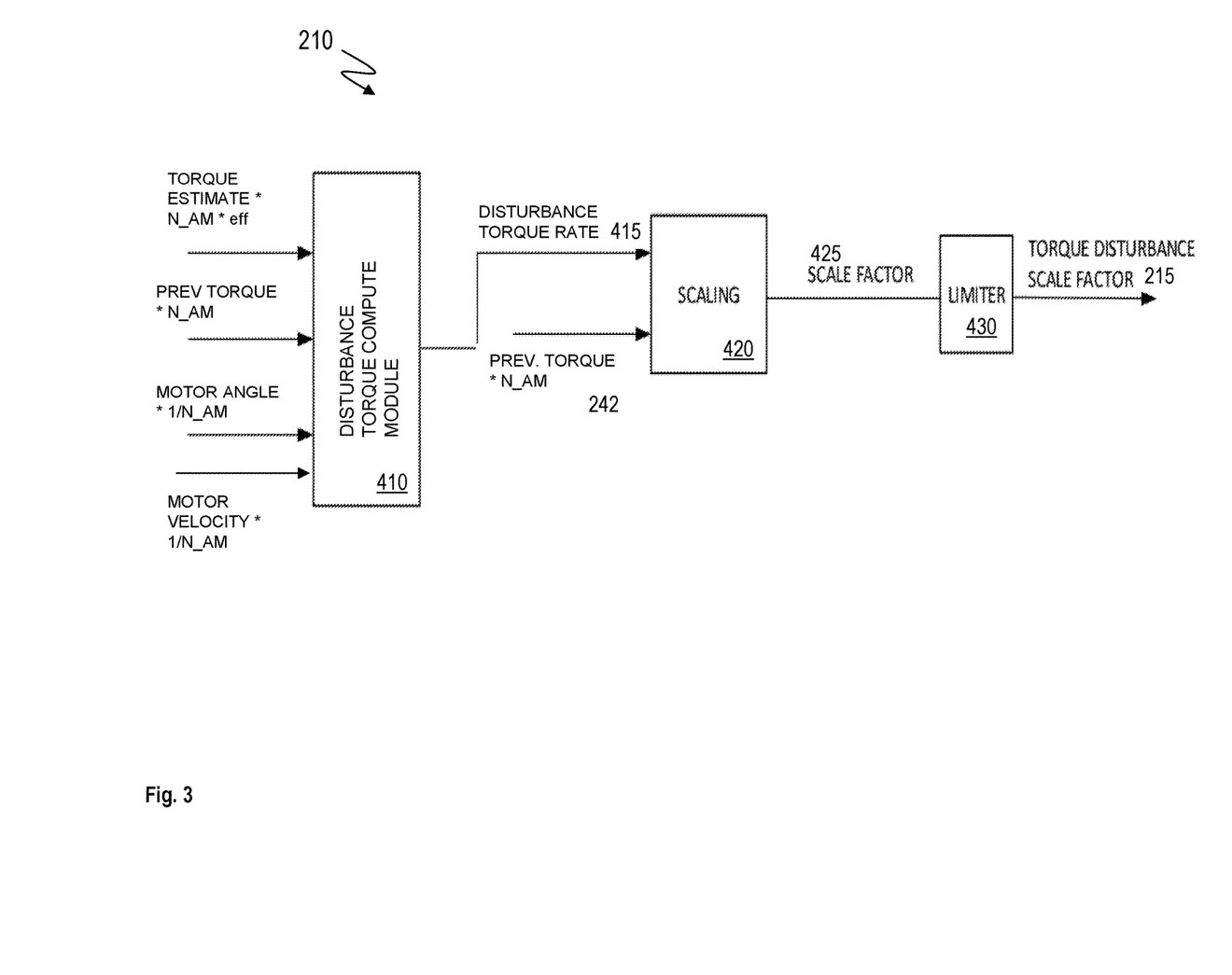
FIG. 3 illustrates example components and an example dataflow diagram of a driver intent detection module in accordance with some embodiments.

FIG. 3 illustrates a dataflow diagram of the driver intent detection module 210. The driver intent detection module 210 includes a disturbance compute module 410 and a scaling module 420 among other components. The disturbance compute module 410 estimates the disturbance torque rate 415 based on the motor velocity, the motor angle, previous torque assist command 242, and the rack torque estimate 222. The scaling module 420 uses the disturbance torque rate 415 and the previous torque assist command 242 to generate a scaling factor 425. In one or more examples, the scaling factor 425 may be output as the $T_{dis}$-SF 215. Alternatively, the driver intent detection module 210 includes a rate limiter 430 that limits the output rate of change of the scaling factor 425. As illustrated in FIG. 2, the control module 40 uses the torque disturbance scaling factor $T_{dis}$-SF 215 to scale the estimated rack torque 222 to produce the motor torque assist command 225.

Figure 4:
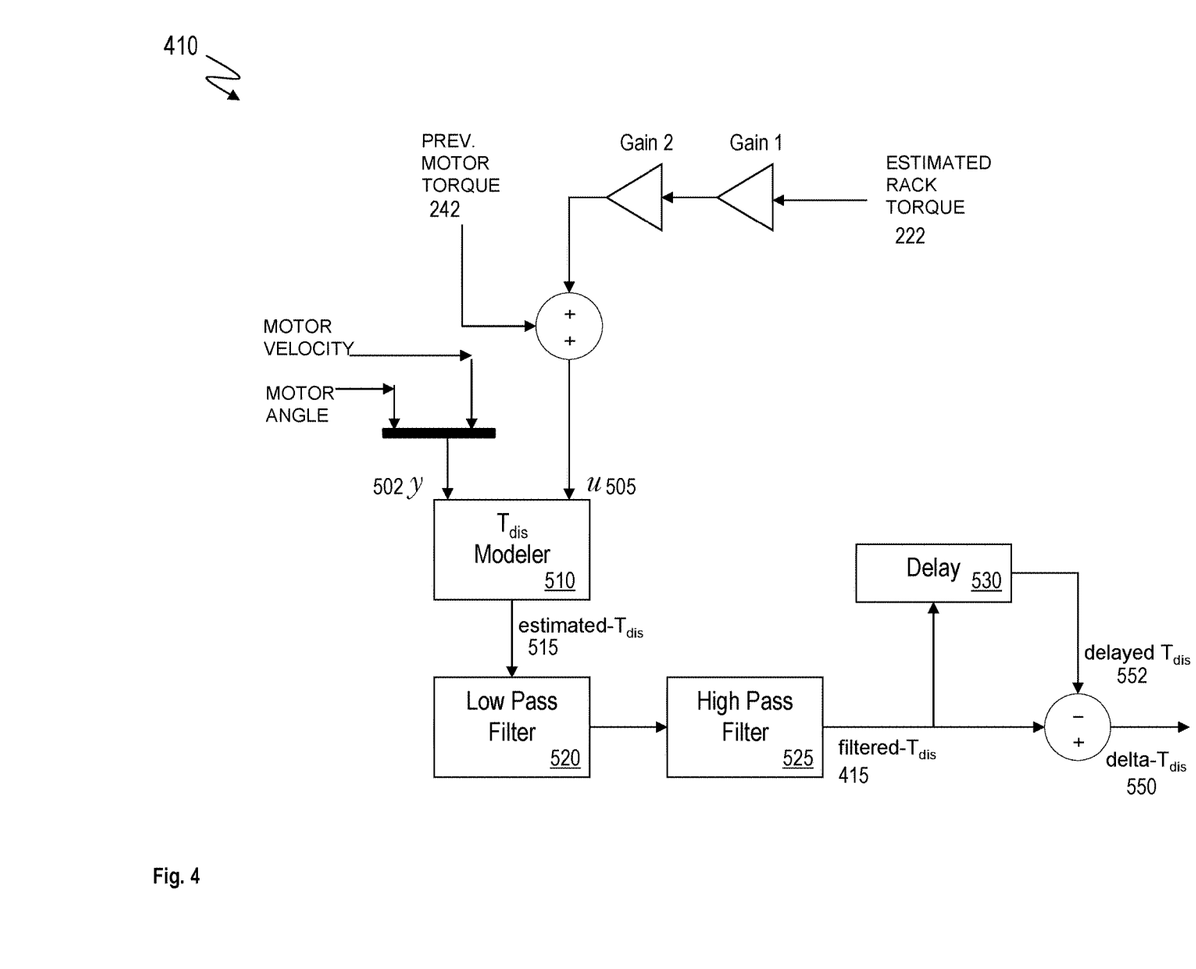
FIG. 4 depicts example components and an example dataflow of a disturbance compute module in accordance with some embodiments.

Further, the driver intent detection module 210 scales the inputs to the disturbance compute module 410 to match units of the hand-wheel coordinate system. For example, the driver intent detection module 210 uses a gain value defined as N_AM to scale the inputs, where N_AM is a ratio between motor rotation speed and handwheel (HW) rotation speed. In addition, the driver intent detection module 210 may use a constant term 'eff', which indicates a mechanical efficiency between the motor and rack. In one or more examples, as shown in FIG. 4, the actual motor torque (measured by a sensor) is scaled by a product of N_AM and eff. Motor position, motor velocity, and estimated rack torque are scaled by various values based on N_AM. Accordingly, the disturbance compute module 410 provides a disturbance torque 415 in handwheel coordinates. It is understood that the inputs to the disturbance compute module 410 may be scaled in a different manner than what is described above.

FIG. 4 depicts example components and an example dataflow of the disturbance compute module 410. The disturbance compute module 410 includes a disturbance torque modeler 510, a low pass filter 520, a high pass filter 525, and a delay component 530, among other components. In one or more examples, the disturbance torque modeler 510 computes an estimated $T_{dis}$ value 515 which is then band-pass filtered to obtain a filtered torque disturbance 415 using an extended state observer algorithm in the continuous domain. However, it is understood that other implementations may be used as well such as, for example, the discrete domain.

The disturbance torque modeler 510 may implement the extended state observer algorithm. The term extended state refers to the addition of unknown inputs to system states. In one approach, the system (e.g., the steering system 12) may contain between six to eight state variables, however it is understood any number of variables may be used as well. Some examples of state variables include, for example, position, and velocity. The extended state observer may be expressed by equation 1 as:

$$\dot{\hat{x}}_{obs} = A_{obs}\hat{x}_{obs} + B_{obs}u + L(y-\hat{y}) \quad (1)$$

where the cap or hat symbol "^" is used to indicate an estimated signal (e.g., a calculated or predicted system output), and the subscript "obs" indicates observed. Specifically, $x_{obs}$ refers to a state of the steering system 12, and contains state variables that represent values inside the steering system 12. The term $\hat{x}_{obs}$ refers to a calculated state of the steering system 12. The term $\dot{\hat{x}}_{obs}$ represents the rate of change of the system state, or a state change (e.g., the differentiation of $\hat{x}_{obs}$). The term u refers to system input. The term y refers to system output. The term $A_{obs}$ refers to a system matrix, and determines how the current state (e.g., $\hat{x}_{obs}$) affects the state change; $\dot{\hat{x}}_{obs}$. The term $B_{obs}$ represents a control matrix, and determines how the system input u affects the state change $\dot{\hat{x}}_{obs}$. L represents the observer gain matrix, and determines how an error e between a measured system output y and a calculated system output ŷ affects the state change $\dot{\hat{x}}_{obs}$. Finally, the term $C_{obs}$ (not expressed in equation 1) refers to an output matrix, and calculates system output ŷ using the calculated state $\hat{x}_{obs}$.

Figure 5:
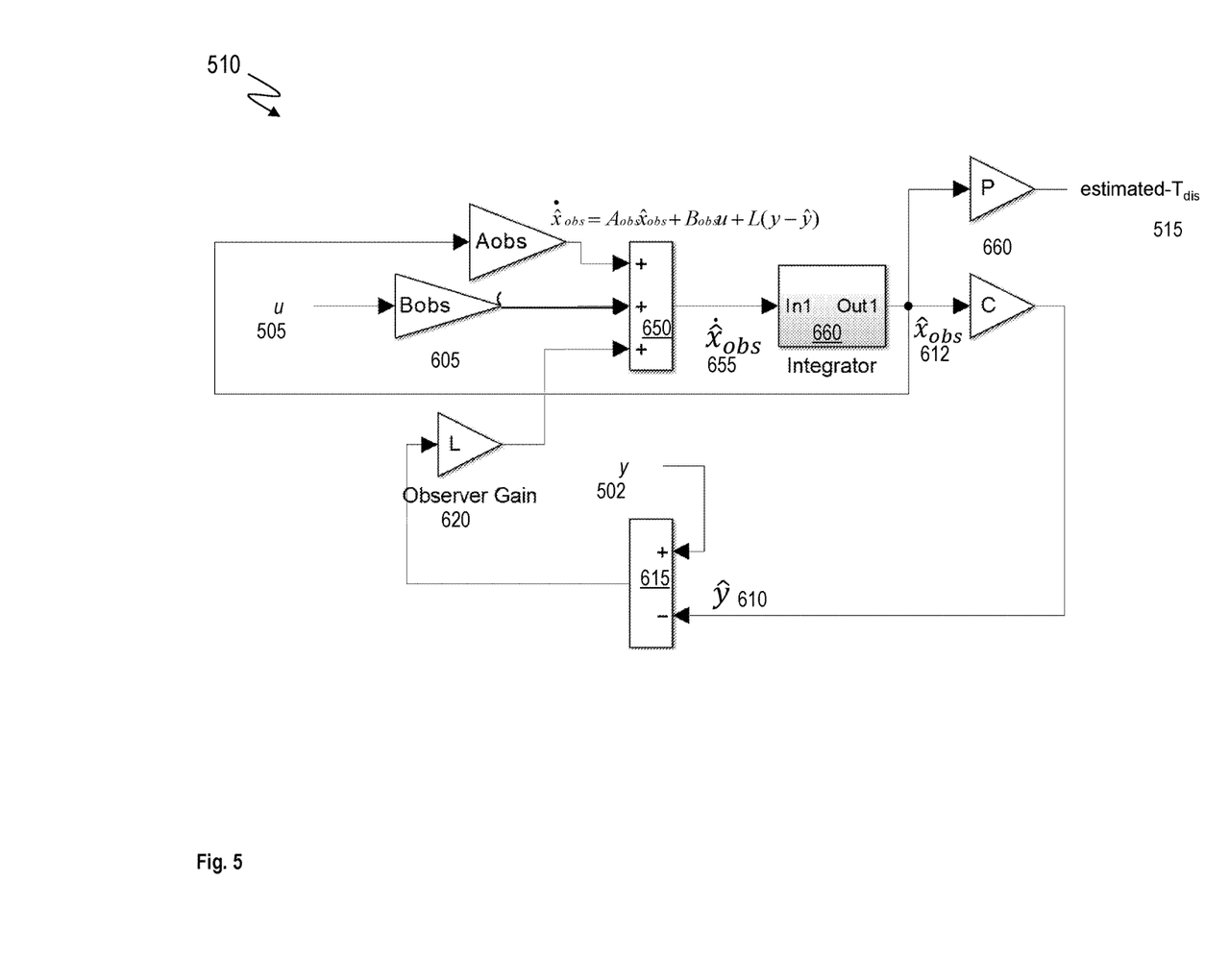
FIG. 5 depicts a dataflow diagram of the disturbance compute module for computing disturbance torque in accordance with some embodiments.

Referring to FIG. 4, the inputs that are shown are the scaled versions of the input as described herein. The disturbance torque modeler 510 uses the extended observer algorithm described above and the scaled inputs to compute the disturbance torque rate $T_{dis}$ 415. In one or more examples, the scaled inputs may be further processed prior to the extended observer model using the inputs. For example, the estimated rack torque 222 may be passed through one or more gain components that scale the estimated rack torque 222 by predetermined values as shown. The disturbance torque modeler 510 also receives the previous motor torque 242. The previous motor torque 242 and the estimated rack torque 222 values may be blended together, for example by using an adder component as shown in FIG. 5. The previous motor torque 242 and the estimated rack torque 222 together are the input 'u' 505 to the extended observer algorithm. In addition the disturbance torque modeler 510 receives the motor angle and motor velocity signals, which together form the input 'y' 502 to the extended observer algorithm.

FIG. 5 depicts a dataflow diagram of the disturbance compute module 410 for computing the disturbance torque rate 415 according to the extended observer algorithm based on a one-mass model. It is understood that other examples of the disturbance compute module 410 may use different scheme of calculation or digital filters. As described earlier, the algorithm uses the input u 505 to determine the estimated output ŷ 610, and further compares the actual measured output y 502 (angle, velocity) to the estimated output ŷ 610. The difference between y and ŷ is an error that is to be minimized. The disturbance compute module 410 computes a matrix L 620 such that drives the error of y-ŷ to zero, and therefore causes the estimated states x̂ 612 to approach the values of the actual states x. In one or more examples, the matrix L 620 may be determined using Kalman filtering.

The $T_{dis}$ modeler 510 includes a subtractor component 615 that receives the input y 502 and the estimated output ŷ 610 to compute the difference y-ŷ. The output difference is multiplied by the matrix L and passed to an adder 650. The adder 650 also receives the input u 505 after being scaled using the predetermined $B_{obs}$ matrix to generate the term $B_{obs}\cdot u$, as shown at block 605. The adder component 650 receives, as a third input the estimated states x̂ 612 after being scaled using the predetermined $A_{obs}$ matrix. The adder component 650, thus, adds the three terms that are on the right-hand-side of Equation 1. The output of the adder 650 provides the vector $\dot{\hat{x}}_{obs}$ 655 that represents a rate of change of the system state, which is integrated by an integrator 660 to output a vector of the estimated states x̂ 612. Multiplying the vector of the estimated states x̂ 612 with a selector matrix P provides the estimated $T_{dis}$ 515 as the output of the $T_{dis}$ modeler, as shown at block 670.

Referring back to FIG. 4, the disturbance torque rate 415 ($T_{dis}$) is passed through the low pass filter 520 and the high pass filter 525 to facilitate the $T_{dis}$ to be within a specific frequency band. The filter cutoff frequencies are calibrateable. For example, the low pass filter 520 may limit the $T_{dis}$ to a frequency of less than 20 Hz, and the high pass filter 525 may limit the $T_{dis}$ to a frequency of more than 0.2 Hz. It is understood that other frequency limits may be used in other examples. In one or more examples, the $T_{dis}$ 415 is output to the scaling block after the band pass filtering by the low pass filter 520 and the high pass filter 525. By band pass filtering the disturbance torque rate $T_{dis}$ 415 in this manner, the disturbance torque compute module 410 eliminates noise from the disturbance torque rate $T_{dis}$ 415 using the low pass filter 520. The elimination of the noise facilitates the disturbance torque rate $T_{dis}$ 415 to be differentiated to monitor a rate of change of the disturbance torque rate $T_{dis}$ 415, as described herein. Additionally, the high pass filtering eliminates a constant force component from the disturbance torque rate $T_{dis}$ 415 by using the high pass filter 525.

The estimated disturbance torque rate $T_{dis}$ 415 matches measured torsion bar torque ($T_{tbar}$) well as long as the error $T_{uncertainty}$ is close to zero. However, when the error $T_{uncertainty}$ is significant (for example, >=0.05), an offset error is introduced between $T_{tbar}$ and $T_{dis}$. Hence, using $T_{dis}$ directly as a main control signal to provide the assist command 225 may lead to incorrect estimation of the driver torque signal. Accordingly, the technical solutions described herein use a rate of change of $T_{dis}$ 415, to predict the driver intention.

For example, the disturbance compute module 410 computes a delta-$T_{dis}$ value 550 to use the rate of change of filtered-$T_{dis}$ 415. The disturbance torque compute module 410 computes the delta-$T_{dis}$ value 550 by computing a difference between the filtered-$T_{dis}$ 415 and a delayed $T_{dis}$ value 552. The delayed $T_{dis}$ value 552 is computed by passing the $T_{dis}$ value 415 through a delay component 530, which may be a unit delay component. The delta-$T_{dis}$ value 550 represents an instantaneous change in the driver steering input.

The driver intent detection module 210 uses the delta-$T_{dis}$ value 550 to compute the scalar output $T_{dis}$-SF 215 by passing the delta-$T_{dis}$ value 550 to the scaling module 420, which combines the disturbance torque rate with the previous assist command 242 to provide the torque disturbance scaling factor $T_{dis}$-SF 215.

Figure 6:
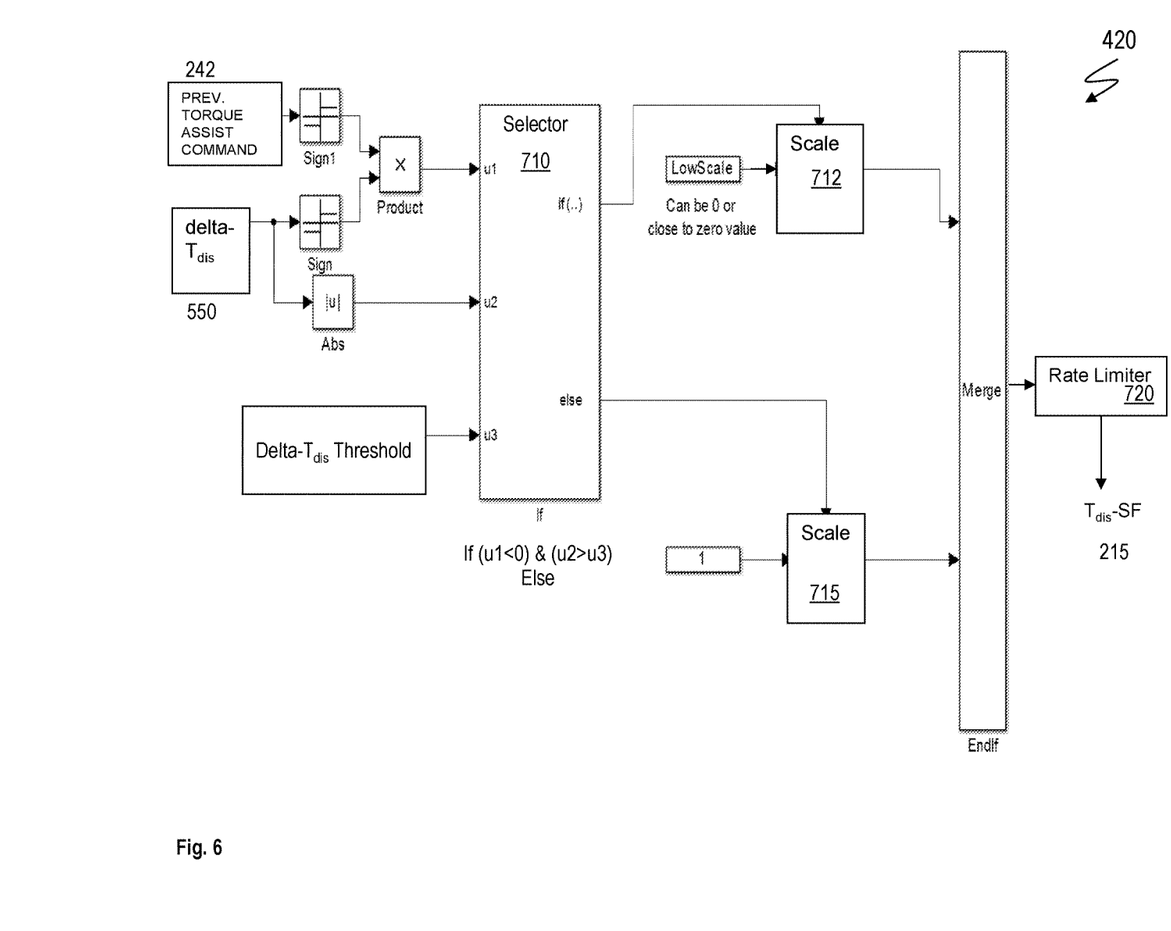
FIG. 6 depicts example components and an example dataflow of a scaling module in accordance with some embodiments.

FIG. 6 depicts example components and an example dataflow of the scaling module 420. The scaling module 420 receives the previous assist command 242 and the delta-$T_{dis}$ value 550 as inputs. The scaling module 420 includes a selector 710 among other components. In one or more examples, if the previous assist command 242 and the delta-$T_{dis}$ are opposite in sign (that is one is less than zero and the other is greater than zero), and if delta-$T_{dis}$ magnitude is greater than a predetermined calibration value, the selector 710 uses a lower scalar value, (for example 0) for the $T_{dis}$-SF 215 value, as shown at block 712. Else, if the condition is not met, the selector uses a higher scalar value, for example 1, for the $T_{dis}$-SF 215 value, as shown at block 715. Further, in one or more examples, to avoid continuous switching of the output, a rate limiter 720 is used. The output $T_{dis}$-SF 215 value gets multiplied with the estimated torque 222 to determine the motor torque command 225, as shown in FIG. 2.

Thus, the scaling module 420, and the driver intent detection module 210 provides the $T_{dis}$-SF 215 scalar value, which scales down the assist command when the estimated disturbance input is in opposite direction to the assist command 225. As described earlier, the delta-$T_{dis}$ 550 value is used to predict the driver intent. Accordingly, when the sign of the delta-$T_{dis}$ 550 value is opposite that of the previous assist command 225, it is indicative that an assist command opposite to the driver intent is being provided. Accordingly, the assist command is scaled down to a low value, as shown at block 712. In one or more examples, the assist command is negated or cancelled, for example if the scalar used in block 712 is 0 (zero). Alternatively, if the delta-$T_{dis}$ 550 value and the previous assist command 242 are in the same direction, that is have the same sign, the assist command is not altered, for example by using a scalar value close to 1, as shown at block 715.

The technical solutions described herein provide a power steering system that predicts a disturbance torque rate (Tdis) that is inclusive of driver torque and un-modeled rack torque. Further, the technical solutions monitor changes in the computed Tdis signal to determine changes in driver intent. The power steering system implementing the technical solutions described herein facilitates predicting driver intent when the driver moves a steering wheel of the vehicle even in case of failure or absence of a driver torque signal. The driver torque signal is generally received from a torque sensor in the power steering system. Accordingly, by implementing the technical solutions described herein, the power steering system is able to continue to provide torque assistance in case the torque sensor fails.

In one or more examples, the power steering system uses the predicted disturbance torque rate to provide the torque assistance in case the vehicle is travelling at a speed below a predetermined threshold speed, such as less than 20 KPH. The predetermined threshold speed is representative of a speed value below which the change in the disturbance torque reflects a change in the driver intentions.

The technical solutions described herein, thus, facilitate techniques for using EPS signals such as motor angle, motor velocity, (other than the driver torque $T_{tbar}$ signal) to predict a disturbance torque $T_{dis}$ that is representative of the $T_{tbar}$ signal (and un-modeled system dynamics, which may be caused by non-linearity, error, and signal noise). The technical solutions further use existing motor command and a derivative of the $T_{dis}$ to predict a driver intent signal, in case of absence or failure of the driver torque sensor. Further yet, the technical solutions facilitate scaling down an assist command that provides torque assistance to the steering wheel using a scaling factor based on the driver intent signal. Accordingly, the technical solutions described herein facilitate scaling down the assist command if direction of assist is opposite to $T_{tbar}$ direction. The technical solutions described herein, thus, facilitate an improved tuning for assist in a power steering system used in a vehicle.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

The invention claimed is:

1. A power steering system for providing a motor torque assist command, the power steering system comprising:
a rack torque estimator module that determines an estimated rack torque value based on a motor angle, and a motor velocity;
a driver intent detection module that computes a disturbance torque scaling factor based on the estimated rack torque value by computing a disturbance torque signal based on the estimated rack torque value; and
a blend module that generates the motor torque assist command based on a scaled value of the estimated rack torque value using the disturbance torque scaling factor, the scaling comprising multiplying the estimated rack torque value by the disturbance torque scaling factor.

2. The power steering system of claim 1, wherein the blend module generates the motor torque command based on said scaled value in response to a vehicle speed being below a predetermined threshold.

3. The power steering system of claim 2, wherein the rack torque estimation module is a static tire torque estimation module.

4. The power steering system of claim 1, wherein the driver intent detection module computes the disturbance torque scaling factor by:
computing a disturbance torque signal further based on the motor angle and the motor velocity;
computing a change in the disturbance torque signal; and
implementing a selector to choose between a low value and a default high value for the disturbance torque scaling factor.

5. The power steering system of claim 4, wherein the change in the disturbance torque signal is computed by computing a difference between successive values of the disturbance torque signal.

6. The power steering system of claim 4, wherein the driver intent detection module includes a scaling module that outputs the disturbance torque scaling factor based on the change in the disturbance torque signal and a previous motor torque command.

7. The power steering system of claim 4, wherein the disturbance torque scaling factor scales the motor torque command in response to a value of the change in the disturbance torque signal having a sign opposite to a value of a previous motor torque command.

8. The power steering system of claim 7, wherein the disturbance torque scaling factor scales the motor torque command in response to the value of the change in the disturbance torque signal having a magnitude greater than a predetermined threshold.

9. The power steering system of claim 4, wherein the computation of the disturbance torque scaling factor by the driver intent detection module further comprises eliminating a constant rack force component from the disturbance torque signal using a predetermined band-pass filter.

10. The power steering system of claim 4, wherein the driver intent detection module computes the disturbance torque signal using an extended state observer, which is expressed by:

$$\dot{\hat{x}}_{obs} = A_{obs}\hat{x}_{obs} + B_{obs}u + L(y - \hat{y}),$$

wherein $\hat{x}_{obs}$ refers to a calculated state of the steering system, $\dot{\hat{x}}_{obs}$ represents a state change, u is system input, y is system output, $A_{obs}$ is a system matrix, $B_{obs}$ is a control matrix, L is an observer gain matrix, and $\hat{y}$ is a calculated system output.

11. The power steering system of claim 1, wherein the disturbance torque scaling factor has a value from a predetermined range.

12. The power steering system of claim 1, further comprising a torque sensor configured to detect a driver torque signal from a handwheel of the power steering system, and wherein the blend module generates the motor torque assist command based on said scaled value in response to the torque sensor being in a failure or a disabled state.

13. A method for providing a motor torque assist command by a power steering system, the method comprising:
determining an estimated rack torque value based on a motor angle, and a motor velocity;

computing a disturbance torque scaling factor based on the estimated rack torque value by computing a disturbance torque signal based on the estimated rack torque value; and generating the motor torque command based on a scaled value of the estimated rack torque value using the disturbance torque scaling factor, the scaling comprising multiplying the estimated rack torque value by the disturbance torque scaling factor.

14. The method of claim 13, wherein the motor torque command is generated based on said scaled value in response to a vehicle speed being below a predetermined threshold.

15. The method of claim 14, wherein the motor torque is estimated based on a static tire torque estimation module.

16. The method of claim 13, wherein computing the disturbance torque scaling factor further comprises:

computing the disturbance torque signal further based on the motor angle and the motor velocity;

computing a change in the disturbance torque signal; and implementing a selector to choose between a low value and a default high value for the disturbance torque scaling factor.

17. The method of claim 16, wherein the change in the disturbance torque signal is computed by computing a difference between successive values of the disturbance torque signal.

18. The method of claim 16, further comprising outputting the disturbance torque scaling factor based on the change in the disturbance torque signal and a previous motor torque command.

19. The method of claim 16, wherein the disturbance torque scaling factor scales the motor torque assist command in response to a value of the change in the disturbance torque signal having a sign opposite to a value of a previous motor torque command.

20. The method of claim 19, wherein the disturbance torque scaling factor scales the motor torque assist command in response to the value of the change in the disturbance torque signal having a magnitude greater than a predetermined threshold.

21. The method of claim 13, wherein the disturbance torque scaling factor cancels the motor torque assist command.

22. A power steering system for providing motor torque assist command, the power steering system comprising:

a torque sensor configured to detect a driver torque signal from a handwheel of the power steering system; and a control module configured to:

in response to the torque sensor operating without a failure:

determine a first estimated rack torque value based on a motor angle, a motor velocity, and the driver torque signal; and generate a first motor torque assist command based on the first estimated rack torque value; and in response to detecting a failure of the torque sensor:

determine a second estimated rack torque value based on the motor angle, and the motor velocity;

compute a disturbance torque scaling factor based on the second estimated rack torque value; and generate a second motor torque assist command based on a scaled value of the second estimated rack torque value using the disturbance toque scaling factor, the scaling comprising multiplying the second estimated rack torque value by the disturbance torque scaling factor.

* * * * *